United States Patent [19]
Barrington et al.

[11] Patent Number: 5,300,232
[45] Date of Patent: Apr. 5, 1994

[54] APPARATUS AND PROCESS FOR TREATMENT OF LIQUIDS

[76] Inventors: James W. Barrington, 10337 Birchdale Ave., Downey, Calif. 90241; Randy W. Masters, 1720 Carver St., Redondo Beach, Calif. 90278

[21] Appl. No.: 937,367

[22] Filed: Aug. 28, 1992

[51] Int. Cl.$^5$ ............................. C02F 1/76; B01F 5/04; B01F 15/02
[52] U.S. Cl. ..................................... 210/742; 210/199; 210/205; 210/220; 210/752; 210/756; 210/908; 210/916; 366/165; 366/173
[58] Field of Search .................. 210/198.1, 199, 205, 210/220, 752, 756, 738, 742, 916, 908; 366/145, 148, 165, 167, 173

[56] References Cited

U.S. PATENT DOCUMENTS

| | | | |
|---|---|---|---|
| 1,706,418 | 3/1929 | Sissom | 366/165 |
| 2,126,164 | 8/1938 | Anderson | 210/220 |
| 2,528,514 | 11/1950 | Harvey et al. | 366/173 |
| 2,874,118 | 2/1959 | Albertsen | 210/205 |
| 3,015,554 | 1/1962 | Rummel | 366/165 |
| 3,613,723 | 10/1971 | Witt | 366/173 |
| 3,808,123 | 4/1974 | Neel et al. | 210/15 |
| 3,997,437 | 12/1976 | Prince et al. | 210/220 |
| 4,097,026 | 6/1978 | Haindl | 366/165 |
| 4,231,874 | 11/1980 | Heiligtag | 210/220 |
| 4,818,412 | 4/1989 | Conlan | 210/704 |

Primary Examiner—Neil M. McCarthy

[57] ABSTRACT

A method and process for the treatment of liquids, including moving injection wands into a tank containing the liquid to be treated and injecting a treating solution through the injection wands to increase the reaction mixing between the injected treating solution and the liquid being treated.

19 Claims, 3 Drawing Sheets

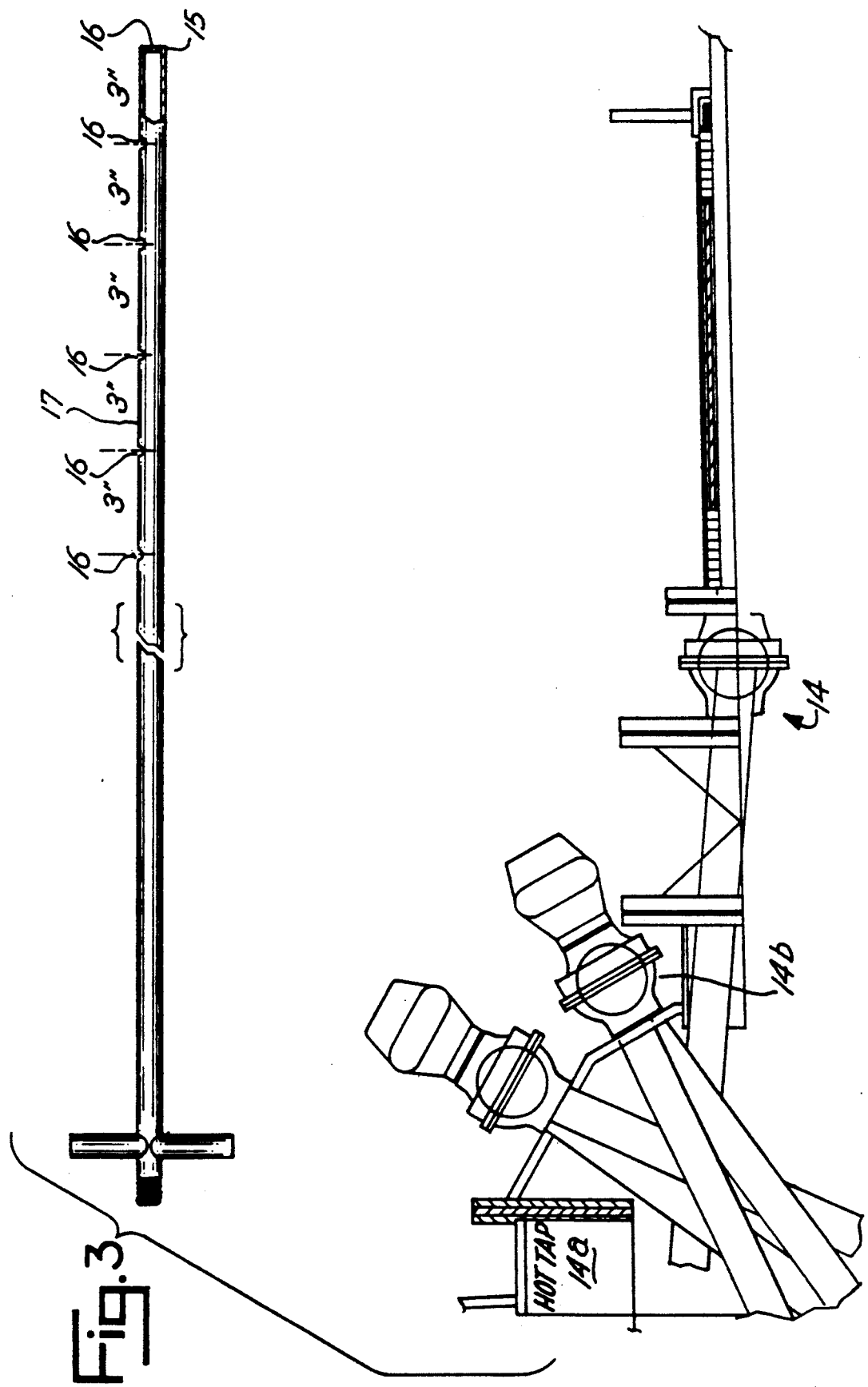

APPARATUS AND PROCESS FOR TREATMENT OF LIQUIDS

BACKGROUND OF THE INVENTION

The in situ treatment of liquids has been a long-standing problem. For example, the in situ neutralization of acidic and caustic liquids has been a long-standing problem in the chemical and oil processing industries. The present invention relates to a new method and apparatus for treating liquids, e.g. neutralizing acidic and caustic liquids, in a tank. More particularly, this invention pertains to the use of a unique and controlled injection method and apparatus to increase the reaction mixing between a treating solution, e.g. a neutralizing solution, and the liquid being treated, e.g. undergoing neutralization. In the preferred embodiment, radial and tangential injection wands are moved into a tank containing a liquid and a treating solution is injected through the injection wands into the tank. This method and apparatus permits one to take advantage of the increased mixing caused by the injection through the injection wands.

The present invention may be applied in a wide range of situations, e.g. chemical neutralization or other treatment of tank contents. One example is the treatment of sour liquid, i.e., liquid that is contaminated with hydrogen sulfide ($H_2S$). Hydrogen sulfide is generated in numerous areas, e.g. oil reservoirs, oil refineries, chemical plants, and waste treatment facilities, including landfills and sanitary waste facilities. The hydrogen sulfide makes liquid "sour" and highly toxic. Any suitable treating solution, e.g. sodium hypochlorite (NaOCl), can be used to treat the sour liquid in the present invention.

The present invention is not limited to the neutralization of sour liquid, and those of skill in the art will recognize many other applications of the present invention, e.g. acid can be injected to neutralize caustics, amines can be injected to treat other sulfide contaminated materials, etc.

It is believed that the present invention can be described as a way to create and take advantage of the Coriolis force, an effect created by high velocity injection through the injection wands. In simplistic terms, Coriolis forces arise when there is radial movement of mass from one point on a rotating plane to a second point. This movement results in a change of the peripheral velocity of the mass and increases the acceleration of the mass. The acceleration of mass generates a force in the plane of rotation and perpendicular to the instantaneous radial movement. The Coriolis phenomenon can be found in nature and is associated with the earth's rotation. For example, the Coriolis force is responsible for the spinning of liquid as it is drained from an ordinary bathroom sink. In the Northern Hemisphere, the Coriolis force causes fluids in motion to spin in a clockwise direction.

The present invention is an improvement over the prior art. For example, U.S. Pat. No. 4,818,412 teaches an apparatus and process for feeding hypochlorite solution to a tank to treat sour water. However, this patent does not teach how the hypochlorite solution can be added to the sour water in a manner that creates and takes advantage of the increased reaction mixing between hydrogen sulfide (the contaminant) and the hypochlorite solution (the treating solution).

The preferred embodiment of the present invention teaches the use of a unique controlled injection method and apparatus using radial and tangential injection wands that are inserted into a tank containing a liquid requiring treatment, injecting treating solution through radial injection wands to stir the liquid within the tank in a clockwise manner, and injecting treating solution through tangential injection wands to increase the reaction mixing between the liquid being treated and the treating solution, and monitoring and controlling the reaction process, thereby providing benefits that have never been attained before.

SUMMARY OF THE INVENTION

The present invention not only provides for the treatment of liquids, but also provides unsurpassed advantages over the prior art. First and foremost, the new invention creates and takes advantage of increased reaction mixing by unique injection through injection wands of a treating solution into a tank containing a liquid requiring treatment. In the preferred embodiment, radial and tangential injection wands are used, and there is at least one radial injection wand corresponding to each tangential injection wand, and they are juxtaposed by an angle.

In the preferred embodiment, the radial injection wand and/or the tangential injection wand can be moved before or during injection to alter the angle between them. Further, in the preferred embodiment, this change in angle between the injection wands can be performed using a socket type ball joint. By allowing for this, the present invention provides increased reaction mixing and increased area of contact between the treating solution and the liquid being treated. Packing glands can be used to seal the tank and allow movement of the injection wands.

The injection of the treating solution through the radial injection wands provides for increased contact between the treating solution and the liquid within the tank, as opposed to just adding the treating solution to the tank. The injection of the treating solution through the radial injection wands causes the contents of the tank to spin around the tank. In the preferred embodiment, the injection of the treating solution through the radial injection wands is performed so as to cause the tank contents to spin in a clockwise direction around the tank.

Injection of the treating solution through the tangential injection wands provides additional contact between the treating solution and the tank contents. Further, the injection through the tangential injection wands in combination with injection through radial injection wands are believed to give rise to the Coriolis effect.

In the preferred embodiment, the treating solution is injected through the tangential wands at an acute angle to the movement of the liquid as it is stirred around the tank by the radial injection wands. The increased reaction mixing between the liquid and treating solution can be used for a wide range of applications. For example, the present invention allows for increased reaction mixing between hydrogen sulfide in sour liquid and a treating solution, such as hypochlorite solution.

The present invention works more efficiently than prior art apparatuses or methods, such as those prior methods and apparatuses for treating sour liquid. The increased reaction mixing obtained with the present invention allows for faster and efficient treatment of liquids, e.g. the neutralization of acidic or caustic liquids. In addition, the present invention allows for the treatment of liquids so that less treating solution is required for treatment.

In the preferred embodiment, the present invention also provides for the circulation of a stream of liquid and/or any selected treating solution, and injection of that admixture through the injection wands. In the preferred embodiment, the admixture is pumped to the injection wands by at least one circulation pump. This in turn provides for intimate contact and reaction mixing between the treating solution and the circulating stream of liquid being treated. The admixture is then injected into the tank through the injection wands.

The present invention also provides a controllable, safe and predictable rate of reaction between the treating solution and the liquid requiring treatment. The present invention also provides for in situ treatment of a liquid in a closed tank under pressure, thereby eliminating and/or reducing noxious odors and air pollution.

Also, the reaction mixing provided by the wand system of the present invention maximizes the suspension of contained solids residual within the tank. By doing so, the present invention prepares the tank contents for further processing, such as ex-situ processing of tank contents, (e.g. filter press, centrifuge or other sludge dewatering apparatus).

BRIEF DESCRIPTION OF THE DRAWINGS

FIG. 3 is a top or plan view of a radial and a tangential injection wand of the preferred embodiment of the invention.

DETAILED DESCRIPTION OF THE DRAWINGS

The following description focuses on just one of many possible applications of the present invention, i.e., the treatment of sour liquid with a treating solution, e.g. hypochlorite solution. Those of skill in the art will recognize many other applications in the neutralization or other treatment of liquids. For example, those of skill in the art will recognize that the present invention can be used to treat virtually any contaminated liquid with a selected treating solution(s) to react with and chemically change contaminants in the liquid thereby reducing the contaminants in the liquid.

Figure 1:
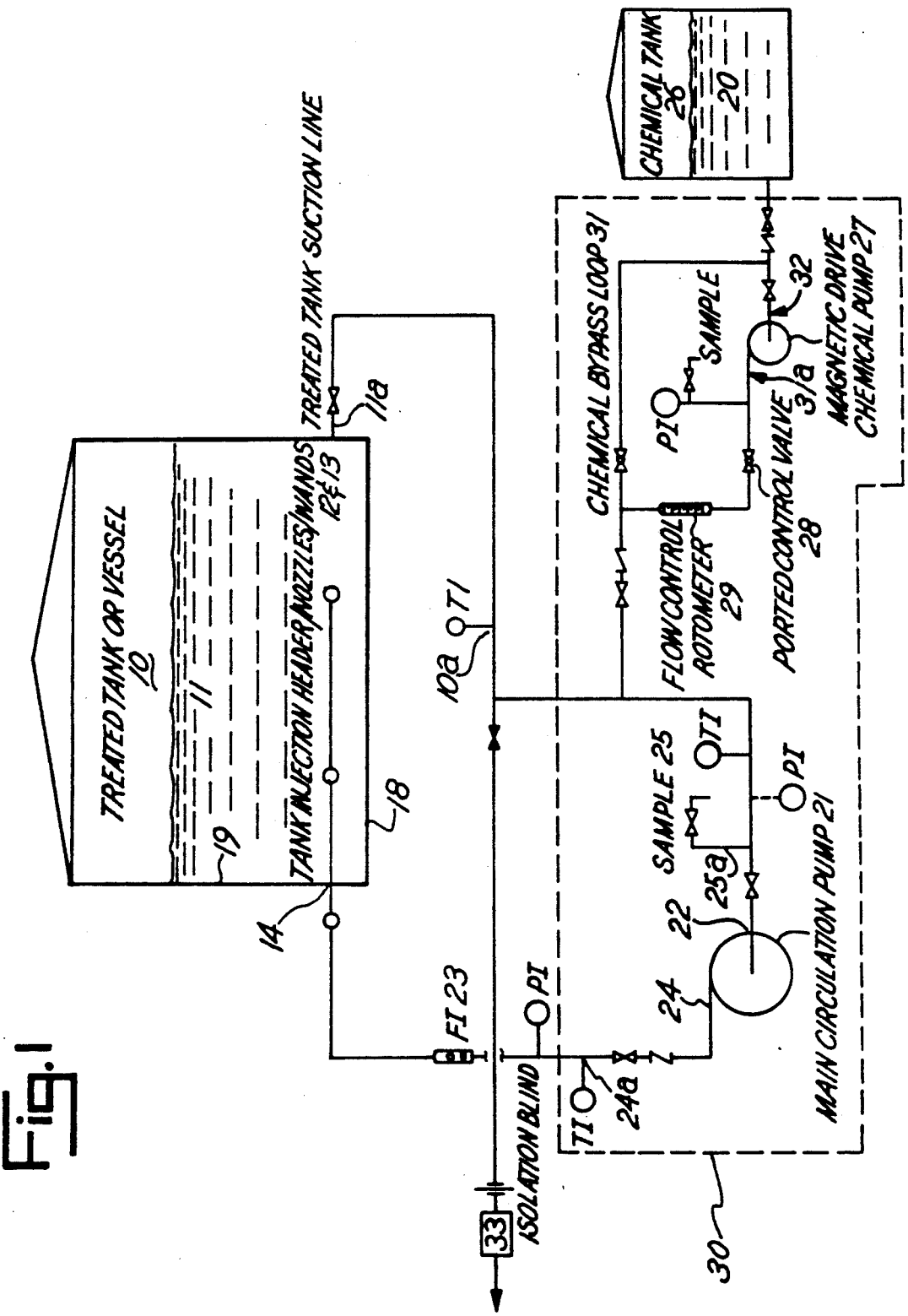
FIG. 1 is a schematic flow diagram of the preferred apparatus of the invention.

As shown in FIG. 1, in the preferred embodiment, there is a tank 10 that contains sour liquid 11 for which neutralization is desired. As shown further in FIG. 2, there is at least one radial injection wand 12 and at least one corresponding tangential injection wand 13 that are inserted in the tank 10. In the preferred embodiment, each tangential injection wand 13 is inserted into tank 10 at about the same location in-tank 10 as the corresponding radial injection wand 12 and is juxtaposed at an acute angle to the corresponding radial injection wand 12. In the preferred embodiment, this angle can be altered before or during injection. Further, this change in angle between the injection wands can be performed using a socket type ball joint 14b (See FIG. 3). The tank 10 has specially drilled openings 14a and is fitted with packing glands 14 so that the radial injection wands 12 and tangential injection wands 13 can be inserted into tank 10. Most preferably, the radial injection wands and the corresponding tangential wands are a inserted into tank 10 through the same drilled opening 14a. There may be more than one radial injection wand 12 and/or tangential injection wand 13 at each opening 14a, i.e. location of wand insertion. The tank 10 can be any size, and a tank 10 of 6 to 225 feet in diameter can be used to suitably treat liquid 11. In the preferred embodiment, there is about 5 to 10 feet of flow from each injection wand to accomplish effective scrubbing of the tank 10 bottom 18 and walls 19.

The number of wands to use in the present invention depends on the individual tank size and type of material to be treated (i.e., the chemical composition of the material and the percent liquid, solids and semi-solids). The number of wands also may depend on the overall economics involved and the degree of desired treatment.

Figure 2:
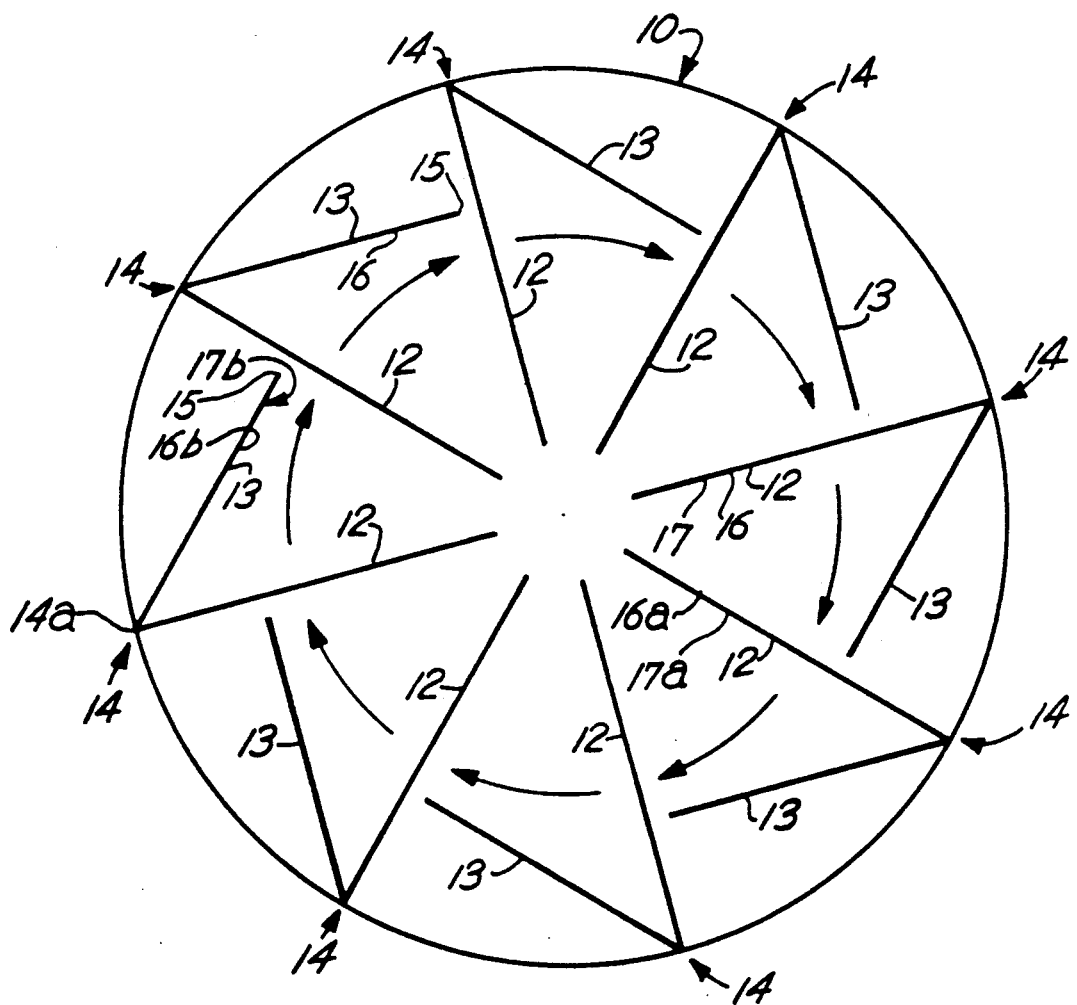
FIG. 2 is a top or plan view of injection wands inserted into a tank in the preferred embodiment of the invention.

As shown in FIGS. 2 and 3, each wand has a hole 16 at the injection end 15 and holes 16 along one side 17. For the radial injection wands 12, the holes 16a are preferably placed on the side 17a that will allow injection in a clockwise manner relative to the diameter of the tank 10. For the tangential injection wands 13, the holes 16b are preferably placed on the side 17b that faces the center of the tank 10. Typically, the wands are positioned about 18 inches above the bottom 18 of the tank 10. The injection is made at sufficient pressure to keep the bottom 18 and walls 19 of the tank 10 scoured free of solids. It is desired to achieve a well mixed homogenous mixture in the tank 10 to maximize contact between the treating chemical 20 and the sour liquid 11. In the preferred embodiment for the treatment of sour liquid 11, the treating solution 20 includes sodium hypochlorite. Using sodium hypochlorite instead of a more rapid oxidizer provides for a safer and controlled treatment of the sour liquid 11, though there maybe cases where other oxidizers may be utilized.

Although only a stoichiometric amount of treating solution 20 is needed to oxidize and remove hydrogen sulfide from the sour liquid 11, other contaminants, e.g. hydrocarbons, may make it preferable that more than a stoichiometric amount of treating solution 20 be used. Empirically, it has been found that about 1 gallon of 12% hypochlorite solution is preferable to treat about 42 gallons of tank 10 contents for a typical type of sour liquid 11, e.g., sour water, that needs treatment.

As further shown in FIG. 1 of the preferred embodiment, a stream of sour liquid 11a is taken from the tank 10 and circulated through a circulation pump 21. The treating solution 20 is added at the influent or suction side 22 of the circulation pump and is mixed with the circulating stream of sour liquid 11a. The circulation pump 21 then pumps the admixture to the injection wands 12 and 13 for injection into the tank 10. The treatment of the sour liquid 11 in the tank 10 is performed at ambient temperature, and 40° F. to 110° F. is preferable and 60° F. to 80° F. is most preferable. Temperatures of less than 60° F. tend to slow the reaction of treating solution 20 and hydrogen sulfide in the sour liquid 11 and require longer treatment time. Temperatures above 110° F. give rise to hazards from vapors from hydrocarbons in the tank 10 contents being treated.

Preferably, the circulation pump 21 is operated at a rate sufficient to minimize the collection of solids on the bottom 18 of tank 10 and to maximize the percent of suspended solids in the sour liquid 11. The flow rate of the circulation pump 21 is measured by a flow indicator 23 on the discharge side 24 of the circulation pump 21.

The percent of suspended solids is determined by samples 25 taken a sample port 25a on the influent side 22 of the circulation pump 21. The samples 25 can be placed in an on-site laboratory centrifuge for gravimetric separation and analysis.

In the preferred embodiment, the treating solution 20, e.g. hypochlorite solution, is stored in a separate storage tank 26. This storage tank 26 can be of any suitable material and construction, e.g., a double walled polyethylene-lined tank.

In the preferred embodiment, after the circulation pump 21 circulates the sour liquid 11 for a sufficient time and rate so as to maximize the percent of suspended solids in the sour liquid 11, a chemical pump 27, e.g. a magnetic drive type pump, is started and operated to pump the treating solution 20 from the storage tank 26 to the influent side 22 of the circulation pump 21. Preferably, the treating solution 20 is pumped by the chemical pump 27 from the storage tank 26 to the influent side 22 of the circulation pump 21 through a ported control valve 28 and through a flow control rotameter 29. In this preferred embodiment, the chemical pump 27 only needs to overcome the head pressure in the treatment tank 10 that contains the sour liquid 11. In the preferred embodiment, about 30 psig for the chemical pump 27 discharge pressure is sufficient.

The ported control valve 28 can be manually or automatically adjusted to achieve the desired flow of treating solution 20 through the flow control rotameter 29. In the preferred embodiment, a flow rate of 2 to 20 gallons per minute of treating solution 20 into the influent side 22 of the circulation pump 21 is typical for a rate of 1,000 to 2,000 gallons per minute of circulating sour liquid 11.

The rate of injection of the treating solution 20 at the influent side 22 of the circulation pump 21 is monitored and controlled by system 30. System 30 monitors and controls the difference in temperature of the circulating stream of sour liquid 11a at tank outlet 10a and the admixture of circulating sour liquid 11a and treating solution 20 at point 24a, on the effluent side (discharge) 24 of the circulation pump 21, i.e. before injection of the admixture to the tank 10. In the preferred embodiment, the rate of injection of the treating solution 20 is maintained at a level so that this difference in temperature is no more than 15° F. Typically, the difference in temperature does not rise above 5° F. throughout the process because of the heat sink effect of the volume of the sour liquid 11 within tank 10. This heat sink effect is an important safety benefit of the invention. Because the treating solution 20 reacts rapidly with the hydrogen sulfide in the sour liquid 11 when treating solution 20 is hypochlorite solution, but more slowly with other sulfur bearing molecules, e.g. mercaptans or olefins, there is typically no rapid temperature rise and the large volume of sour liquid 11 in the tank 10 acts as a heat sink.

If the differential begins to be more than 15° F., the ported control valve 28 can be closed to reduce the rate of treating solution 20. In addition or alternatively, a chemical bypass loop 31 can be opened that will in turn bypass some of the treating solution 20 from the discharge side 31a of chemical pump 27 back to the suction side 32 of the chemical pump 27 and reducing the amount of treating solution 20 pumped by chemical pump 27 to the circulation pump 21.

Flow rates from the circulation pump 21 can be 2,020 gallons per minute and the pump discharge can be about 125 psig. In the preferred embodiment, it is desired to have about 5 to 10 feet of flow from each injection wand to accomplish effective scrubbing of the tank 10 bottom 18 and walls 19.

Typically, the treatment process of the present invention is run until the liquid is treated to the desired level. In the treatment of sour liquid, the process of the present invention is preferably run until the amount of hydrogen sulfide in the treated liquid is reduced to less than 5 ppm. The liquid can be further treated with flocculating compounds and filter systems 33 if desired. Typically, the treatment of a tank of sour liquid takes about 72 hours, but depends on various factors, such as the amount of hydrogen sulfide and other contaminants in the sour liquid.

The foregoing detailed description of the invention has been made in general terms and with respect to several preferred embodiments. Many of the preferred apparatuses and methods stated herein may be varied by persons skilled in the art without departing from the spirit and scope of the present invention as set forth in the following claims.

What is claimed is:

1. A process for the treatment of liquids, comprising:
   (a) placing a plurality of injection wands about a circumference and through openings in a wall of a tank containing a liquid to be treated, said wall defining said circumference, wherein each injection wand has a tangential arm and a radial arm that are connected by a joint that allows for an angle between said arms to be altered, and
   (b) injecting a treating solution through at least one location on each of said tangential arms and radial arms of said injection wands to promote reaction mixing between the injected treating solution and the liquid being treated.

2. The process of claim 1 including the step of moving a tangential arm or a radial arm of an injection wand to alter the angle between said tangential arm and said radial arm of said injection wand before or during said step of injecting said treating solution.

3. The process of claim 2 wherein the step of moving the radial arm or the tangential arm of an injection wand is performed using a socket type ball joint.

4. The process of claim 1 wherein the step of placing a plurality of injection wands through said wall of the tank includes the step of placing more than one injection wand through the same opening in the wall of the tank.

5. The process of claim 1 including the step of mixing the treating solution with a circulating stream of liquid being treated to form an admixture which is injected into the tank through the injection wands.

6. The process of claim 5 including the step of monitoring and controlling the treatment of the liquid being treated during the treatment process by measuring the temperature of the circulating stream of liquid being treated and the temperature of the admixture before injection of the admixture to the tank and maintaining the difference between the measured temperatures within a desired temperature range by controlling the amount of injection of the treating solution.

7. The process of claim 6 wherein the desired temperature range is about less than 15° F.

8. The process of claim 1 wherein the liquid being treated contains one or more of the group consisting of sour water, hydrocarbons, and suspended solids.

9. The process of claim 1 wherein the treating solution comprises a hypochlorite solution.

10. The process of claim 9 wherein the hypochlorite solution comprises sodium hypochlorite.

11. A process for the treatment of a liquid containing contaminants, comprising:
   (a) placing a plurality of injection wands about a circumference and through openings in a wall of a tank containing the contaminated liquid to be treated, said wall defining said circumference, wherein each injection wand has a tangential and radial arm that are connected by a joint that allows for an angle between said arms to be altered, and injecting a treating solution through at least one location on each of said tangential arms and said radial arms to promote reaction mixing between the injected treating solution and the liquid being treated and performing such treatment until the level of contaminants in the liquid being treated is reduced to a desired level.

12. An apparatus for the treatment of liquids, comprising: a plurality of injection wands spaced about the circumference and inserted through openings in a wall of a tank containing a liquid to be treated, said wall defining said circumference, wherein each injection wand has a tangential arm and a radial arm that are connected by a joint that allows for an angle between said arms to be altered, and at least one location on each said tangential arm and said radial arm whereby a treating solution can be injected into the tank to promote reaction mixing between the injected treating solution and the liquid being treated.

13. The apparatus of claim 12 wherein the joint is a socket type ball joint.

14. The apparatus of claim 12 further comprising more than one injection wand inserted through the same opening in said wall of said tank.

15. The apparatus of claim 12 including means for mixing the treating solution with a circulating stream of liquid being treated to form an admixture which can be injected into the tank through said injection wands.

16. The apparatus of claim 15 further comprising monitoring and controlling means for measuring the temperature of the circulating stream of liquid being treated and the temperature of the admixture before injection of the admixture to the tank and maintaining the difference between the measured temperatures within a desired temperature range by controlling the amount of injection of the treating solution.

17. The apparatus of claim 16 wherein the means for monitoring and controlling the treatment of the liquid includes maintaining the desired temperature range to about less than 15° F.

18. An apparatus for the treatment of a liquid containing contaminants, comprising: a plurality of injection wands, each injection wand having a tangential arm and a radial arm connected by a joint that allows for an angle between said arms to be altered, each injection wand spaced about a circumference and inserted through openings in a wall of a tank containing a contaminated liquid, said wall defining said circumference, and means for treating a contaminated liquid by the injection of a treating solution through at least one location on each of said tangential arms and radial arms to promote reaction mixing between the treating solution and the liquid containing contaminants until the contaminants are reduced to a desired level.

19. The apparatus of claim 12 further comprising means for moving the radial or the tangential arm of an injection wand to alter the angle between said tangential arm and said radial arm of said injection wand.

* * * * *